United States Patent
Hermanrud

(10) Patent No.: US 12,516,600 B2
(45) Date of Patent: Jan. 6, 2026

(54) METHOD FOR ESTIMATING DEPTH OF HYDROCARBON RESERVOIR

(71) Applicant: EQUINOR ENERGY AS, Stavanager (NO)

(72) Inventor: Christian Hermanrud, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 417 days.

(21) Appl. No.: 18/001,905

(22) PCT Filed: Jul. 2, 2021

(86) PCT No.: PCT/NO2021/050159
§ 371 (c)(1),
(2) Date: Dec. 15, 2022

(87) PCT Pub. No.: WO2022/005299
PCT Pub. Date: Jan. 6, 2022

(65) Prior Publication Data
US 2023/0235662 A1 Jul. 27, 2023

(30) Foreign Application Priority Data
Jul. 2, 2020 (GB) .................................. 2010153

(51) Int. Cl.
*E21B 47/047* (2012.01)
*E21B 49/02* (2006.01)
(Continued)

(52) U.S. Cl.
CPC ............ *E21B 47/047* (2020.05); *E21B 49/02* (2013.01); *G01N 15/0886* (2013.01);
(Continued)

(58) Field of Classification Search
CPC ....... G01V 3/20; E21B 2200/20; E21B 49/02; E21B 47/047; G01N 27/04; G01N 15/0886
See application file for complete search history.

(56) References Cited

U.S. PATENT DOCUMENTS

| | | | |
|---|---|---|---|
| 4,903,207 A * | 2/1990 | Alger | E21B 49/005 73/152.06 |
| 5,193,059 A | 3/1993 | Tiab et al. | |

(Continued)

OTHER PUBLICATIONS

International Search Report and Written Opinion for PCT/NO2021/050159, dated Aug. 27, 2021 (8 pp.).
(Continued)

*Primary Examiner* — Lisa M Caputo
*Assistant Examiner* — Nyla Gavia
(74) *Attorney, Agent, or Firm* — Eversheds Sutherland (US) LLP

(57) ABSTRACT

A method of estimating a depth of a hydrocarbon-water contact of a hydrocarbon reservoir in a structure. The method may include the steps of analysing one or more samples obtained from the structure to generate a relationship relating resistivity to hydrocarbon-water contact depth, obtaining a resistivity measurement of the hydrocarbon reservoir, and estimating the hydrocarbon-water contact depth from the relationship relating resistivity to hydrocarbon-water contact depth and the resistivity measurement of the hydrocarbon reservoir.

12 Claims, 2 Drawing Sheets

(51) Int. Cl.
   *G01N 15/08*   (2006.01)
   *G01N 27/04*   (2006.01)
   *G01V 3/20*    (2006.01)

(52) U.S. Cl.
   CPC ............... *G01N 27/04* (2013.01); *G01V 3/20* (2013.01); *E21B 2200/20* (2020.05)

(56) References Cited

U.S. PATENT DOCUMENTS

| | | | |
|---|---|---|---|
| 5,621,169 | A | 4/1997 | Harris et al. |
| 10,400,590 | B1* | 9/2019 | Aldred .................... E21B 49/00 |
| 2009/0125238 | A1* | 5/2009 | Barboza .............. E21B 49/0875 |
| | | | 702/11 |
| 2010/0155142 | A1* | 6/2010 | Thambynayagam ... E21B 44/00 |
| | | | 175/61 |

OTHER PUBLICATIONS

Search Report, GB2010153.1, dated Mar. 30, 2021 (9 pp.).
El-Gendy, N., et al., Reservoir assessment of the Nubian sandstone reservoir in South Central Gulf of Suez, Egypt, Journal of African Earth Sciences, vol. 129, 596-609, XP029963813, doi:10.1016/j.jafrearsci, 2017 Section 2.2.8-3.

* cited by examiner

METHOD FOR ESTIMATING DEPTH OF HYDROCARBON RESERVOIR

TECHNICAL FIELD

The present invention relates to the field of hydrocarbons. In particular, it relates to a method of estimating, or a method for use in estimating, the size or depth of a hydrocarbon reservoir. For example, the method may involve estimating a location (depth) of a hydrocarbon-water contact.

BACKGROUND OF THE INVENTION

FIG. 1 illustrates a sub-surface region of which it may desired to estimate the size or depth of a hydrocarbon reservoir 12. In particular, it may be desired to estimate the location of the hydrocarbon-water (e.g. oil-water) contact 14. The sub-surface region contains reservoir rock with a hydrocarbon-containing part (the hydrocarbon reservoir 12) located above a water-bearing part 13. The interface between the hydrocarbon reservoir 12 and the water-bearing part of the reservoir rock 13 is the hydrocarbon-water contact.

A first well 10 is provided for exploring for hydrocarbons in the sub-surface region. As can be seen in FIG. 1, the well bore 10a of the well 10 extends through the hydrocarbon reservoir 12. As such, the first well 10 can only explore for hydrocarbons from the hydrocarbon reservoir 12 down to the depth at which the well bore 10a exits a lower boundary of the hydrocarbon reservoir 12. This depth is indicated by a dashed line 16.

Assuming no other wells (e.g. such as the well 11 shown in FIG. 1) exist, it is usually unknown how much further the hydrocarbon reservoir 12 extends below the depth indicated by the dashed line 16. Thus, typically, one or more appraisal wells, such as the appraisal well 11, are provided to check this and determine the location of the hydrocarbon-water contact 14, or to what extent 15 the hydrocarbon reservoir 12 extends below the depth indicated by the dashed line 16 to the hydrocarbon-water contact 14.

Once the depth of the hydrocarbon-water contact 14 is known, the volume of the hydrocarbon reservoir 12 may be estimated, and this may be used (along with other factors) to (help) make a decision about whether to provide further wells to further explore for hydrocarbons in, or to extract hydrocarbons from, the hydrocarbon reservoir 12.

However, appraisal wells are very costly. If the hydrocarbon reservoir only extends a small distance 15 further (below the dashed line 16) until the hydrocarbon-water contact 14 is met, then a great deal of money may be wasted in drilling the appraisal well(s).

SUMMARY OF THE INVENTION

A first aspect of the invention relates to a method of estimating a depth of a hydrocarbon-water contact of a hydrocarbon reservoir in a structure, the method comprising:
a. analysing one or more samples obtained from the structure to generate a relationship relating resistivity to hydrocarbon-water contact depth; b. obtaining a resistivity measurement of the hydrocarbon reservoir; and c. estimating the hydrocarbon-water contact depth from the relationship relating resistivity to hydrocarbon-water contact depth and the resistivity measurement of the hydrocarbon reservoir.

A hydrocarbon-water contact is an interface (which is typically horizontal, due to gravity) at which a hydrocarbon-containing part of a reservoir (a hydrocarbon reservoir) meets a water-containing part of a reservoir. The hydrocarbon-water contact may be an oil-water contact or a gas-water contact.

The depth of the hydrocarbon-water contact may be measured with respect to any vertical position such as sea-level or a vertical position of a well head, for example.

The term "structure" refers to the sub-surface region in which the hydrocarbon reservoir is located. For example, it may comprise the hydrocarbon reservoir and surrounding material (e.g. rock such as caprock).

The resistivity measurement of the hydrocarbon reservoir may be obtained from well log data, for example (e.g. downhole data acquired by measurement of quantities that respond to properties of rocks and fluids).

The resistivity measurement of the hydrocarbon reservoir may be or comprise a measurement of the electrical conductivity of the hydrocarbon reservoir (as resistivity is the inverse of conductivity). The resistivity (or conductivity) measurement may be a measurement of the electrical resistivity (or conductivity) of the reservoir rock with its contained (e.g. hydrocarbon) fluids.

The method involves analysing one or more samples (e.g. one or more rock samples) obtained from the structure to generate a relationship relating resistivity to hydrocarbon-water contact depth.

Resistivity may be related to hydrocarbon-water contact depth because (a) the buoyancy of the hydrocarbons (e.g. oil) below a position in the reservoir increases the hydrocarbon (e.g. oil) pressure, and therefore the capillary pressure (hydrocarbon- (e.g. oil-) water pressure) here, (b) the higher the capillary pressure, the higher the hydrocarbon (e.g. oil) saturation, and (c) the higher the hydrocarbon (e.g. oil) saturation, the higher the resistivity.

Analysing one or more samples obtained from the structure can allow resistivity to be related to hydrocarbon (e.g. oil) saturation, hydrocarbon saturation to be related to capillary pressure, and capillary pressure to be related to the depth of the hydrocarbon-water contact.

Thus, the present invention provides a method of estimating the depth of a hydrocarbon-water contact of a hydrocarbon reservoir in a structure using one or more samples from the structure and a resistivity measurement of the hydrocarbon reservoir. From the one or more samples from the structure and the resistivity measurement, the depth of the hydrocarbon-water contact of the hydrocarbon reservoir may be estimated.

This method of estimating the depth of the hydrocarbon-water contact is much simpler and less costly than other known methods, which typically involve drilling one or more appraisal wells to determine the depth of the hydrocarbon-water contact.

At step a, the method comprises analysing one or more samples obtained from the structure to generate a relationship relating resistivity to hydrocarbon-water contact depth. The relationship relating resistivity to hydrocarbon-water contact depth is preferably a functional relationship.

In some cases, only a single sample may be used in order to generate such a relationship relating resistivity to hydrocarbon-water contact depth.

As such, the hydrocarbon-water contact depth may (subsequently) be estimated using (such) a (functional) relationship relating resistivity to hydrocarbon-water contact depth. By providing such a (functional) relationship with which hydrocarbon-water contact depth may be estimated, this means that it may not be necessary to use averages or averaged relationships, for example from other wells or many (core) measurements, and which may be less accurate that using a functional relationship, derived for example from a single sample.

Preferred or possible implementations of steps a-c are described in more detail below.

The method may comprise (e.g. prior to step a.) obtaining the one or more samples from the structure, for example using a standard or common method for obtaining samples, as is known in this field. The one or more samples are preferably obtained from the hydrocarbon-containing part of the reservoir (the hydrocarbon reservoir).

Preferably, step a. comprises analysing a plurality of samples. For example, 2-10 or more samples may be analysed. In some embodiments, around 5-7 samples are analysed. The number of samples analysed may vary depending on various factors. Analysing a plurality of samples (e.g. instead of a single sample) may help to provide a better estimate of the hydrocarbon-water contact depth (e.g. as described below), for example by providing a more accurate (functional) relationship relating resistivity to hydrocarbon-water contact depth. As such, the method may comprise obtaining a plurality of samples from the structure.

Preferably, an estimate of the hydrocarbon-water contact depth is provided from each sample. An average (e.g. mean) may then be taken from (at least some of, or possibly all of) these estimates to provide an average estimate of the hydrocarbon-water contact depth. For example, an average (e.g. mean) may be taken from at least some of, or possibly all of, the hydrocarbon-water contact depth estimates from resistivity measurements taken from locations which are in pressure communication with each other. Thus, such measurements may be used to provide an average estimate of the hydrocarbon-water contact depth.

In some embodiments, any samples which produce an outlying result (e.g. an estimate of the hydrocarbon-water contact depth which is significantly different from (the) other, or a majority of the other estimates) may be rejected. An average (mean) of the remaining results may then be taken to provide the estimate of the hydrocarbon-water contact depth.

The one or more samples may comprise material originating from the hydrocarbon reservoir. The one or more samples may be taken from various locations in the structure, or more preferably in the hydrocarbon reservoir. For example, the one or more samples may be taken from locations in the wellbore or from wellbore edges. The samples may comprise a part of a core plug, a side wall core, and/or a drill cutting.

If a plurality of samples are obtained, the plurality of samples are preferably obtained from different locations. Preferably, the plurality of samples are obtained from at least two different depths.

Ideally, the samples are taken at a plurality of different sample depths. The sample depths may have a spacing of up to around 50 m, for example. However, in some cases (e.g. if this is not possible), smaller sample depth spacings may be used, for example down to around 10 cm spacings. The samples should ideally be taken at depths over which the hydrocarbon reservoir extends.

In some embodiments, the samples depths may be chosen based on wireline log data. For example, the sample or samples may be taken at a location or locations at which the depth of the resistivity log can be calibrated to the depth of the sample with confidence (e.g. because the resistivity log fluctuates little around the sample depth).

Preferably, the one or more samples have a minimum size (e.g. thickness in any direction) of around 0.3 mm. However, in some cases, e.g. where grain diameters in the sample are larger than around 0.1 mm, samples larger than 0.3 mm (in all directions) may be needed.

Analysing the one or more samples preferably comprises analysing one or more thin sections of the sample(s). As such, the method may comprise obtaining one or more thin sections of (e.g. each of) the one or more samples.

The one or more samples (or at least one or more of the one or more samples) are preferably of low permeability. Preferably, the samples have a permeability between 0.05 and 50 mD. Such samples may be of low porosity, as low porosity may result in low permeability.

The one or more samples (or at least one or more of the one or more samples) preferably have intermediate to low hydrocarbon saturations such as between 20% and 70%. This is because the saturations are often not sensitive to capillary pressures when the hydrocarbon saturations are outside this saturation range. Samples with low hydrocarbon saturations may be taken from rocks with low permeability and narrow pore throats. Such low-permeable zones may exist in otherwise permeable reservoirs, e.g. if the clay content in the reservoir sand is high, the grain size is small, or if the zone is more cemented than the surrounding reservoir rocks. Such high cementation can significantly reduce the permeability in rocks and typically more in fine-grained rocks than in rocks with larger grain sizes. The one or more samples are therefore preferably taken from horizons with comparatively poor reservoir quality. For example, the one or more samples may be taken from regions with high clay content, small and/or heterogeneous grain size, high detrital or authigenic clay content or high grain ductility.

Analysing one or more samples preferably comprises obtaining one or more (preferably high-resolution) images of the pore structure of the one or more samples. The one or more images of the pore structure of the one or more samples may be obtained from one or more thin sections of the one or more samples. A scanning electron microscope (SEM) may be used to obtain the images of the pore structure. The images (e.g. as obtained with a SEM) may have a resolution of around 2.5 µm or less.

Analysing one or more samples may comprise obtaining one or more capillary pressure (e.g. MICP) measurements from one or more of the one or more samples.

Capillary pressure measurements may be used: to calibrate a relationship between saturation and capillary pressure in a model of (at least a part of) the structure; and/or in a resistivity model of at least a part of the structure (e.g. a part of the structure from which the one or more samples were obtained), and preferably both. Thus, the method may comprise calibrating a relationship between saturation and capillary pressure, e.g. using one or more capillary pressure measurements, and/or using (or applying) one or more capillary pressure measurements in a model of at least a part of the structure.

The model may be a numerical model. The model is ideally a model of the pore structure of at least a part of the structure (e.g. of the rock from which it is formed, and from which the one or more samples were obtained). Such a model may be used to model or provide a relationship between resistivity and hydrocarbon saturation.

References to a model of at least a part of the structure refer to a model of a part of the structure, or in particular the hydrocarbon reservoir, from which the one or more samples were obtained.

Capillary pressure may be related to hydrocarbon column height (or hydrocarbon-water contact depth) using the reservoir fluids' (hydrocarbon and brine) densities and the relationship P=Δρgh, where P is the capillary pressure (e.g. determined from resistivity), Δρ is the difference in density between water and hydrocarbons, and h is the height of the oil column.

Generating a relationship relating resistivity to hydrocarbon-water contact depth may comprise generating (or using) a model of at least a part of the structure, e.g. a model as described above.

The model may be generated based on, or from, the images of the pore structure of the one or more samples.

In some embodiments, generating the model may comprise estimating a formation resistivity factor and/or an absolute permeability of the structure (or a part of the structure from which the one or more samples were obtained). One or both of these may be used to simulate resistivity of the structure (or the part of the structure from which the one or more samples were obtained) as a function of saturation and/or a relationship between saturation and capillary pressure.

Generating the model preferably comprises simulating: the resistivity of the structure (or the part of the structure from which the one or more samples were obtained) as a function of saturation; and/or a relationship between saturation and capillary pressure in the structure (or the part of the structure from which the one or more samples were obtained) (and preferably both).

Generating a relationship relating resistivity to hydrocarbon-water contact depth may comprise relating resistivity to hydrocarbon saturation; relating hydrocarbon saturation to capillary pressure (e.g. what pressure does it take to get a certain amount of hydrocarbon into the sample); and/or relating capillary pressure to the hydrocarbon-water contact depth (and preferably all three of these).

Resistivity may be related to hydrocarbon saturation using the Archie equation.

Hydrocarbon saturation may be related to capillary pressure (e.g. using laboratory measurements), for example by measurement of mercury injection capillary pressures (MICPs), optionally supplemented by saturation-height analyses, e.g. by the Leverett J-function.

Preferably, the relationship relating resistivity to hydrocarbon-water contact depth comprises a function or set of values relating resistivity to hydrocarbon-water contact depth. A set of values may be provided in the form of a table or database of values relating resistively to hydrocarbon-water contact depth. This relationship may then be used to determine or estimate the hydrocarbon-water contact depth based on the resistivity measurement of the hydrocarbon reservoir.

The method may further comprise using the estimated hydrocarbon-water contact depth (e.g. along with any other required factors) to estimate a volume of the hydrocarbon reservoir and/or a volume of hydrocarbons contained in the hydrocarbon reservoir. For example, the hydrocarbon-water contact depth and information about the shape of the hydrocarbon reservoir may be used to estimate the volume of the hydrocarbon reservoir. The volume of the hydrocarbon reservoir (or the hydrocarbon-water contact depth and information about the shape of the hydrocarbon reservoir), the porosity (or a porosity distribution) of the hydrocarbon reservoir, and the hydrocarbon saturation of the hydrocarbon reservoir may be used to estimate the volume of hydrocarbons contained in the hydrocarbon reservoir.

The volume of the hydrocarbon reservoir and/or the volume of hydrocarbons contained in the hydrocarbon reservoir may then be used, for example along with other data or information, in future decision-making.

For example, the method may further comprise using the estimated volume of the hydrocarbon reservoir and/or the volume of hydrocarbons contained in the hydrocarbon reservoir to decide whether to extract hydrocarbons from the hydrocarbon reservoir based. Other data or information may of course also be used in making such a decision.

The method may comprise using the estimated volume of the hydrocarbon reservoir to decide whether or not to drill a well, such as an appraisal well to explore the reservoir or a production well to extract hydrocarbons from the reservoir. Other data or information may of course also be used in making such decisions.

Other data or information that may be taken into account in making such decisions may include the cost, difficulty and/or danger of drilling in that region, for example.

In some embodiments, the method may further comprise drilling an appraisal well. The method may optionally comprise exploring for hydrocarbons with the appraisal well.

In some embodiments, the method may further comprise drilling a production well. The method may optionally comprise extracting hydrocarbons from the hydrocarbon reservoir with the production well.

As can be appreciated from the above, the method of determining the depth of the hydrocarbon-water contact of a reservoir can be of particular benefit if used for a structure where an appraisal well is being considered, and/or where knowledge of the hydrocarbon-water contact position is an important issue.

The above method is preferably, at least partially, performed on a computer or computer system.

A further aspect of the invention relates to a computer program product comprising computer readable instructions that, when run on a computer, is configured to cause one or more processers to perform the method described above, with any of its optional or preferred features.

A further aspect of the invention relates to a system for performing the above method, with any of its preferred or optional features. The system may comprise one or more software elements arranged to perform the method, or one or more parts of the method, described above.

A system may comprise one or more memories and one or more processors configured to perform the method(s), or one or more parts of the method(s), as described above. The one or more memories may store data used as an input to the method (e.g. seismic data) and/or data output from the method. The one or more processors may be programmed with software (e.g. computer program(s)) which causes them to perform the method, or one or more parts of the method, of the present invention. The system may comprise one or more screens and/or data input means, e.g. for a user to control the performing of the method, or one or more parts of the method, and/or view an output of the method on a screen.

For greater speed and efficiency, the method, or at least part of the method, is preferably performed on, or implemented by, a computer.

The methods in accordance with the present invention may be implemented at least partially using software e.g. computer programs. It will thus be seen that when viewed from further aspects, the present invention provides computer software specifically adapted to carry out the methods, or one or more parts of the methods, herein described when installed on data processing means (e.g. one or more processors), a computer program element comprising computer software code portions for performing the methods, or one or more parts of the methods, herein described when the program element is run on data processing means, and a computer program comprising code means adapted to perform one or more steps of a method or of the methods herein described when the program is run on a data processing system. The data processor may be a microprocessor system, a programmable FPGA (field programmable gate array), etc.

The invention also extends to a computer software carrier comprising such software which when used to operate a processor or microprocessor system comprising data processing means causes in conjunction with said data processing means said processor or system to carry out the steps (or one or more of the steps) of the methods of the present invention. Such a computer software carrier could be a physical storage medium such as a ROM chip, RAM, flash memory, CD ROM or disk, or could be a signal such as an electronic signal over wires, an optical signal or a radio signal such as to a satellite or the like.

It will be appreciated that in some embodiments, not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with (or within) a computer system. Such an implementation may comprise a series of computer readable instructions fixed on a tangible medium, such as a non-transitory computer readable medium, for example, diskette, CD ROM, ROM, RAM, flash memory or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

BRIEF DESCRIPTION OF THE DRAWINGS

Preferred embodiments of the invention will now be described by way of example only and with reference to the accompanying drawings, in which.

DETAILED DESCRIPTION

Figure 1:
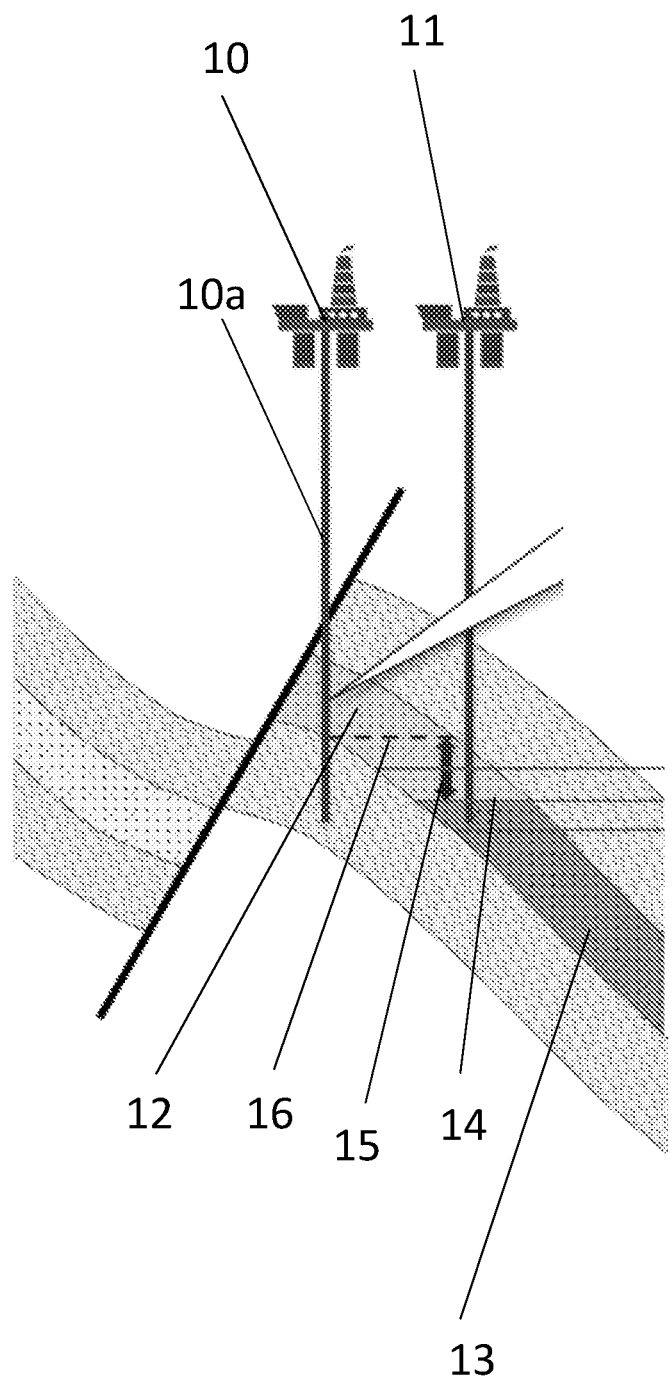
FIG. 1 is a schematic cross-sectional diagram of a subsurface region containing a hydrocarbon reservoir.
Figure 2:
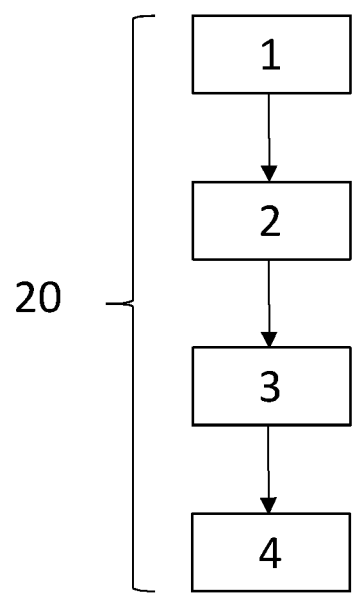
FIG. 2 is a flow diagram illustrating a method for estimating the location of the hydrocarbon-water contact of a region.

A method 20 of estimating the depth of the hydrocarbon-water contact of a hydrocarbon reservoir is illustrated in FIG. 2. The method 20 contains four main steps 1-4.

At step 1, a rock sample is collected from a location in the region. The sample may be a cutting or core from inside the well bore 10*a* or a sidewall core from the borehole walls.

At step 2, the sample is analysed to generate a pore-scale numerical model of the rock from which the sample was taken and a relationship (e.g. a function or set of values such as a table or database) relating (simulated) resistivity to (simulated) hydrocarbon-water contact depth.

At step 3, resistivity data is obtained from well log data taken from the well 10. The relationship generated at step 2 is then used to determine (estimate) the hydrocarbon-water contact depth corresponding to the resistivity value from the well log data.

At step 4, a volume of the hydrocarbon reservoir above the estimated hydrocarbon-water contact depth (and which is not yet accessible by well 10) is estimated and a decision may be taken about whether or not to drill an appraisal well to confirm the presence of those hydrocarbons.

In order to provide a better estimate of the hydrocarbon-water contact depth, steps 1-3 are repeated for a number of samples taken from different locations at different depths. In one embodiment, six samples are used. However, in other embodiments, more or fewer could be used.

The samples are taken from locations in the wellbore or from wellbore edges, from rocks that originated within the hydrocarbon reservoir (i.e. prior to drilling of the well). The samples comprise a core, a side-wall core, and/or cuttings.

Ideally, the samples are taken at a plurality of different sample depths. The sample depths may have a spacing of up to around 50 m, for example. However, in some cases (e.g. if this is not possible due to the vertical size of the reservoir, for example), smaller sample depth spacings may be used, for example down to around 10 cm spacings.

The samples are taken from depths over which the hydrocarbon reservoir extends.

In some embodiments, the samples depths are chosen based on the wireline log data. For example, the samples may have a depth interval such that the depths of the resistivity log can be calibrated to the depths of the samples with confidence (e.g. because the resistivity log fluctuates little around the sample depth).

The well log measurements should be representative of the samples, which means that cuttings may have to be avoided as a sample location unless the resistivity log responses are invariant over a large depth, with a minimum vertical extent of the invariance of the well log resistivity depending on the drilling rate and the distance to the closest casing shoe.

The minimum sample size (e.g. its thickness in any direction) is typically around 0.3 mm. However, in some cases where grain diameters in the sample are larger than around 0.1 mm, samples larger than 0.3 mm (in all directions) may be needed.

The results from analyses of any samples which produce an outlying result (i.e. an estimate of the hydrocarbon-water contact depth which is significantly different from (the) other, or a majority of the other estimates) are rejected and an average (mean) of the remaining results from samples that were in pressure communication with each other prior to drilling is taken to provide the estimate of the hydrocarbon-water contact depth.

The hydrocarbon-water contact depth corresponds to the depth of the bottom of the hydrocarbon column. This may be measured with respect to any suitable point, e.g. sea level.

At step 1, the samples taken are ideally of low permeability. Preferably, the samples have a permeability between 0.1 and 50 mD.

The samples ideally have intermediate to low oil saturations such as between 20% and 70%. This is because the saturations are not sensitive to capillary pressures when the oil saturations are outside of this range. Samples with low oil saturations can be taken from rocks with low permeability and narrow pore throats. Such low-permeable zones may exist in otherwise permeable reservoirs, e.g. if the clay content in the reservoir sand is high, the grain size is small, or if the zone is more cemented than the surrounding reservoir rocks. Such high cementation will significantly reduce the permeability in rocks, and more in fine-grained rocks (which had small pore throats initially) than in more coarse-grained rocks. The samples should thus be taken from horizons with comparatively poor reservoir quality (e.g. high clay content, small and/or heterogeneous grain size, high detrital or authigenic clay content, or high grain ductility). These horizons should be expected to have different Archie parameters to the parameters that apply for the bulk of the reservoir. As a result, saturation analyses from pore-scale modelling should preferably be performed instead of saturation analyses based on Archie's law and saturation-height-function analyses.

The samples are taken using a standard procedure. A thin section is taken from each sample for analysis.

The analysis of the (each) sample at step 2 comprises obtaining high-resolution SEM (scanning electron microscope) images of the thin sections. Such images typically have a resolution of 2 μm or less.

Based on these images, a pore-scale numerical model of the rock from which the sample was taken is generated.

The numerical model enables estimation of relationships relating:
  (i) resistivity to oil saturation;
  (ii) oil saturation to capillary pressure (i.e. what pressure does it take to get a certain amount of oil into the sample); and
  (iii) capillary pressure to oil column height (or the depth of the hydrocarbon-water contact).

The outcome of step 2 is a table of values, function or other relationship relating resistivity to oil column height (or the depth of the hydrocarbon-water contact). If the relationship is provided in the form of a table of values or other such database, it would typically cover resistivity values from around 2 to 2000 Ohms.

For (i), resistivity can be related to oil saturation using the Archie equation:

$$S_w^n = \frac{R_w}{(\Phi^m \times R_t)}$$

where:
  $S_w$ is the water saturation of the uninvaded zone
  n is the saturation exponent, which varies from 1.8 to 4.0 but normally is 2.0
  $R_w$ is the formation water resistivity at formation temperature
  φ is the porosity
  m is the cementation exponent, which varies from 1.7 to 3.0 but normally is 2.0
  $R_t$ is the true resistivity of the formation, corrected for drilling mud invasion, borehole washouts, thin beds, and other effects.

The parameters for the Archie equation can be determined from the analysis of the thin section.

For (ii), oil saturation may be related to capillary pressure using laboratory measurements, most frequently by measurement of mercury injection capillary pressures (MICPs), supplemented by saturation-height analyses, e.g. by the Leverett J-function.

In some embodiments, relationships (i) and/or (ii) can also or alternatively be acquired from pore-scale numerical modelling and not using the Archie equation or laboratory measurements as described above.

From each pore-scale model (i.e. the model for each sample), formation resistivity factor (resistivity of water-filled rock/resistivity of brine) and absolute permeability are estimated. For example, knowing the resistivity of each mineral type, a 2D numerical model is created of how the rock is composed of the various minerals. Then, the response of sending an electrical current through the sample is simulated, e.g. using Ohm's law. The formation resistivity factor and the absolute permeability are then used to simulate the resistivity of the structure as a function of saturation (i), as well as the relationship between saturation and capillary pressure (ii).

In some embodiments, MICP measurements are obtained from the samples (or some or the samples), and the MICP measurements are used: (a) to calibrate the numerical models of the relations between saturation and capillary pressure; and (b) for direct application to the resistivity model.

MICP measurements show how much mercury can be injected into a sample, and how this amount increases as the mercury pressure increases. This amount is used to calculate pore size distribution of the sample, and it gives capillary pressure ($P_c$) as a function of mercury pressure ($P_c$ in the mercury-water system).

The method computes $P_c$ from the equation:

$$P_c = \frac{2\sigma \cos\theta}{r_c}$$

where σ is the mercury/brine interfacial tension and θ is the contact angle. By substituting σ and θ with values for hydrocarbon/water instead of mercury-water, a different cap pressure vs saturation relationship is obtained (without modelling of saturation versus capillary pressure from pore scale models).

For (iii), the capillary pressure may be related to oil column height using the reservoir fluids' (hydrocarbon and brine) densities and the relationship P=Δρgh, where P is the capillary pressure (determined from resistivity following steps (i) and (ii)), Δρ is the density difference between water and hydrocarbons and h is the height of the oil column.

At step 3, resistivity data is obtained from well log data taken from the well 10. The relationship generated at step 2 is then used to determine (estimate) the hydrocarbon-water contact depth by finding the hydrocarbon-water contact depth that corresponds to the resistivity value in the well log data.

As described above, steps 1-3 are repeated for a number of samples to provide a distribution or set of estimates of the hydrocarbon-water contact depth. From this set of estimates, any outliers may be rejected and then a mean (e.g. geometric or arithmetic) or mode from samples that were in pressure communication in the reservoir may be determined of the remaining estimates to provide a final estimate of the hydrocarbon-water contact depth.

Next, at step 4, a volume of the hydrocarbon reservoir above the estimated hydrocarbon-water contact (and which is not yet accessible by a well) is estimated using the final (e.g. mean or mode as discussed above) estimate of the hydrocarbon-water contact depth, and other parameters that describe the reservoir rock. For example, the volume of the hydrocarbon reservoir will depend on its shape. A volume of hydrocarbons contained in the hydrocarbon reservoir can also be estimated from the volume of the hydrocarbon reservoir (or the hydrocarbon-water contact depth and the shape of the reservoir), the porosity (or a porosity distribution) of the hydrocarbon reservoir, and the hydrocarbon saturation.

Based on the estimated hydrocarbon reservoir volume, or ideally the estimated volume of hydrocarbons contained in the hydrocarbon reservoir, as well as potentially other factors related, for example, to the cost, difficulty or danger of drilling in that region, a decision may then be taken about whether or not to drill a (further) well to explore for or extract those deeper hydrocarbons which had not been identified by the first well 10.

The method has been tested by analysing samples from oil fields by performing measurements and pore-scale modelling of the samples and estimating the oil leg thickness below the sample depths from these samples. The modelling was found to predict the column height below the sample depths with an average error of 15 m for the good samples in each field. It was also found that samples that give inferior or inconsistent results could be identified and rejected.

As can be appreciated from the above, the method of determining the depth of the hydrocarbon-water contact can be of particular benefit if used for a structure where an appraisal well is being considered, and where knowledge of the hydrocarbon-water contact position is an important issue.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A method of estimating a depth of a hydrocarbon-water contact of a hydrocarbon reservoir in a structure, the method comprising:
   a. analysing one or more samples obtained from the structure to generate a relationship relating resistivity to hydrocarbon-water contact depth;
   b. obtaining a resistivity measurement of the hydrocarbon reservoir; and
   c. estimating the hydrocarbon-water contact depth from the relationship relating resistivity to hydrocarbon-water contact depth and the resistivity measurement of the hydrocarbon reservoir;
   wherein analysing one or more samples comprises:
      obtaining images of a pore structure of the one or more samples; and
      obtaining one or more capillary pressure measurements of the one or more samples, the method further comprising:
   d. using the images and the one or more capillary pressure measurements to calibrate a relationship between at least one of a saturation and capillary pressure or in a resistivity model of at least a part of the structure;
   e. using the estimated hydrocarbon-water contact depth to estimate a volume of the hydrocarbon reservoir;
   f. using the estimated volume of the hydrocarbon reservoir to determine whether to extract hydrocarbons from the hydrocarbon reservoir; and
   g. drilling, based on the hydrocarbon-water contact depth, at least one of an appraisal well associated with exploring for hydrocarbons or a production well associated with extracting hydrocarbons from a hydrocarbon reservoir with the production well.

2. A method as claimed in claim 1, further comprising obtaining the one or more samples from the structure.

3. A method as claimed in claim 1, step a. comprising analysing a plurality of samples.

4. A method as claimed in claim 3, wherein the plurality of samples are obtained from at least two different depths.

5. A method as claimed in claim 1, wherein the one or more samples comprise a core plug, a side wall core, and/or a sample from a cutting.

6. A method as claimed in claim 1, wherein generating a relationship relating resistivity to hydrocarbon-water contact depth comprises:
   generating a model of at least a part of the structure;
   relating resistivity to hydrocarbon saturation;
   relating hydrocarbon saturation to capillary pressure; and/or
   relating capillary pressure to the hydrocarbon-water contact depth.

7. A method as claimed in claim 6, wherein the model is a pore scale model.

8. A method as claimed in claim 6, wherein generating a model of at least a part of the structure comprises estimating a formation resistivity factor of at least a part of the structure and/or an absolute permeability of at least a part of the structure.

9. A method as claimed in claim 6, wherein generating a model of at least a part of the structure comprises simulating:
   the resistivity of at least a part of the structure as a function of saturation; and/or
   a relationship between saturation and capillary pressure in at least a part of the structure.

10. A method as claimed in claim 1, wherein the relationship relating resistivity to hydrocarbon-water contact depth comprises a function or set of values relating resistivity to hydrocarbon-water contact depth.

11. A non-transitory computer readable medium comprising computer readable instructions that, when run on a computer, is configured to cause one or more processors to perform the method of claim 1.

12. A system comprising a non-transitory computer readable medium arranged to perform the method of claim 1.

* * * * *